United States Patent
McCann, Jr.

(10) Patent No.: US 10,689,017 B2
(45) Date of Patent: Jun. 23, 2020

(54) CHARGING CART ASSEMBLY

(71) Applicant: MASSP Inovations LLC, Spring, TX (US)

(72) Inventor: Mark J. McCann, Jr., Spring, TX (US)

(73) Assignee: MASSP Inovations LLC, Spring, TX (US)

( * ) Notice: Subject to any disclaimer, the term of this patent is extended or adjusted under 35 U.S.C. 154(b) by 0 days.

(21) Appl. No.: 15/998,444

(22) Filed: Aug. 15, 2018

(65) Prior Publication Data
US 2019/0054943 A1 Feb. 21, 2019

Related U.S. Application Data

(60) Provisional application No. 62/545,766, filed on Aug. 15, 2017.

(51) Int. Cl.
| | | |
|---|---|---|
| *B62B 1/24* | (2006.01) | |
| *B62B 1/26* | (2006.01) | |
| *B62B 5/06* | (2006.01) | |
| *B62B 1/16* | (2006.01) | |

(52) U.S. Cl.
CPC ............. *B62B 1/24* (2013.01); *B62B 1/16* (2013.01); *B62B 1/264* (2013.01); *B62B 1/266* (2013.01); *B62B 5/06* (2013.01); *B62B 2202/022* (2013.01); *B62B 2202/48* (2013.01); *B62B 2203/07* (2013.01); *B62B 2203/30* (2013.01)

(58) Field of Classification Search
CPC .. B62B 1/22; B62B 1/14; B62B 1/264; B62B 1/266; B62B 2202/022
See application file for complete search history.

(56) References Cited

U.S. PATENT DOCUMENTS

| | | | | |
|---|---|---|---|---|
| 3,522,893 A * | 8/1970 | Yokich | ........... | B66F 9/184 |
| | | | | 414/420 |
| 3,587,892 A * | 6/1971 | Vermette | ........... | B66F 9/187 |
| | | | | 414/420 |
| 4,738,582 A * | 4/1988 | Roberts | ........... | B62B 3/04 |
| | | | | 248/142 |
| 4,797,050 A * | 1/1989 | Habicht | ........... | B66F 9/19 |
| | | | | 414/420 |

(Continued)

OTHER PUBLICATIONS

"Top Flite 2-Wheel Push Cart", Dick's Sporting Goods, https://www.dickssportinggoods.com/p/top-flite-2-wheel-push-cart, 4 pages, Jun. 2, 2017.

*Primary Examiner* — Jacob B Meyer
(74) *Attorney, Agent, or Firm* — Bracewell LLP; Douglas W. Rommelmann

(57) ABSTRACT

A charging cart assembly for transporting a refrigerant tank. The charging cart assembly including a frame assembly having a handle at an upper end of the frame assembly and two wheels rotatably mounted to the frame assembly. A swivel plate assembly is mounted to the frame assembly. The swivel plate assembly includes a tank securing device arranged and designed to secure the refrigerant tank to the swivel plate assembly. The swivel plate assembly with the refrigerant tank secured thereto has a generally upright position in which the refrigerant tank is in a generally upright position and has a generally inverted position in which the refrigerant tank is in a generally inverted position.

20 Claims, 4 Drawing Sheets

(56) References Cited

U.S. PATENT DOCUMENTS

| | | | | |
|---|---|---|---|---|
| 4,865,339 A * | 9/1989 | Rundborg | ............ | B62B 5/0003 |
| | | | | 280/47.21 |
| 5,201,540 A * | 4/1993 | Wu | ............ | B62B 1/045 |
| | | | | 280/646 |
| 5,454,576 A * | 10/1995 | Pitkanen | ............ | A63B 55/57 |
| | | | | 280/42 |
| 5,526,894 A * | 6/1996 | Wang | ............ | B62B 1/045 |
| | | | | 180/65.1 |
| 6,302,430 B1 * | 10/2001 | Wu | ............ | B62B 1/045 |
| | | | | 280/646 |
| 6,368,048 B2 * | 4/2002 | Womble | ............ | B62B 3/104 |
| | | | | 414/590 |
| 7,384,050 B2 * | 6/2008 | Blum | ............ | B62B 1/264 |
| | | | | 280/47.26 |
| 7,416,195 B2 * | 8/2008 | Zwack | ............ | B62B 1/264 |
| | | | | 280/43.1 |
| 7,789,611 B2 * | 9/2010 | Wilson | ............ | B62B 3/04 |
| | | | | 280/47.15 |
| 7,862,053 B2 * | 1/2011 | Liao | ............ | B62B 3/02 |
| | | | | 280/38 |
| 7,905,502 B2 * | 3/2011 | Oliver | ............ | B25H 3/00 |
| | | | | 280/35 |
| 8,033,553 B1 * | 10/2011 | Feliciano, Jr. | ............ | B62B 1/22 |
| | | | | 280/43.1 |
| 8,534,682 B2 * | 9/2013 | Volin | ............ | B62B 1/204 |
| | | | | 280/47.18 |
| 9,187,107 B2 * | 11/2015 | Becka | ............ | B62B 1/14 |
| 9,254,856 B2 * | 2/2016 | Oachs | ............ | B62B 3/005 |
| D752,838 S * | 3/2016 | Ziaylek | ............ | D34/28 |
| 9,283,973 B1 * | 3/2016 | Stone | ............ | B60P 1/283 |
| 9,310,022 B2 * | 4/2016 | Sakaguchi | ............ | F17C 1/00 |
| 9,381,932 B1 * | 7/2016 | Giamanco | ............ | A45C 13/262 |
| 9,388,029 B2 * | 7/2016 | Ziaylek | ............ | B65G 7/00 |
| 9,457,824 B2 * | 10/2016 | Moore | ............ | B62B 5/0003 |
| 9,623,892 B2 * | 4/2017 | Roach | ............ | B62B 3/104 |
| 9,943,956 B1 * | 4/2018 | Giamanco | ............ | B25H 5/00 |
| 9,988,172 B2 * | 6/2018 | Ristoski | ............ | B65B 67/1205 |
| 10,005,481 B1 * | 6/2018 | Lopez | ............ | B62B 1/12 |
| 10,173,315 B2 * | 1/2019 | Giamanco | ............ | B25H 5/00 |
| 10,183,686 B2 * | 1/2019 | Goodwin | ............ | B62B 3/10 |
| 2005/0200101 A1 * | 9/2005 | Chang | ............ | B62B 1/045 |
| | | | | 280/651 |
| 2007/0063469 A1 * | 3/2007 | Blum | ............ | B62B 1/264 |
| | | | | 280/47.26 |
| 2007/0182114 A1 * | 8/2007 | Fernandes | ............ | B25H 3/00 |
| | | | | 280/47.35 |
| 2007/0292247 A1 * | 12/2007 | Wilson | ............ | B62B 3/04 |
| | | | | 414/331.06 |
| 2014/0261707 A1 * | 9/2014 | Sakaguchi | ............ | F17C 1/00 |
| | | | | 137/1 |
| 2014/0306410 A1 * | 10/2014 | Becka | ............ | B62B 1/14 |
| | | | | 280/47.18 |
| 2014/0319438 A1 * | 10/2014 | Carlson | ............ | B62B 3/02 |
| | | | | 254/2 R |
| 2015/0210306 A1 * | 7/2015 | Oachs | ............ | B62B 3/005 |
| | | | | 280/79.11 |
| 2017/0050657 A1 * | 2/2017 | Roach | ............ | B62B 3/104 |
| 2017/0113826 A1 * | 4/2017 | Ristoski | ............ | B65B 67/1205 |
| 2017/0183042 A1 * | 6/2017 | Eagan, Jr. | ............ | B62B 1/264 |
| 2018/0079438 A1 * | 3/2018 | Intravatola | ............ | B62B 1/264 |
| 2018/0222035 A1 * | 8/2018 | Giamanco | ............ | B25H 5/00 |
| 2019/0054943 A1 * | 2/2019 | McCann, Jr. | ............ | B62B 1/24 |

\* cited by examiner

CHARGING CART ASSEMBLY

CROSS-REFERENCE TO RELATED APPLICATIONS

This application claims priority under 35 U.S.C. 119(e) to U.S. Provisional Application No. 62/545,766, filed Aug. 15, 2017. U.S. Provisional Application No. 62/545,766 is herein incorporated by reference in its entirety.

BACKGROUND OF THE INVENTION

1. Field of the Invention

The invention relates to wheeled cart for transporting portable equipment, and more particularly to a portable wheeled cart for transporting equipment and tools frequently used by heating, ventilation and air conditioning ("HVAC") technicians.

2. Description of the Related Art

Technicians, such as HVAC technicians, typically have to transport tools, gauges and equipment from a service vehicle to the worksite. The transported goods may be bulky, heavy and require multiple trips. The distance between the vehicle and the worksite may be a substantial distance. Also, in many instances the worksite is outside and the path from the vehicle to the worksite may be grass or gravel. The service may be performed in conditions of rain or extremely hot temperature with the technicians exposed directly to the elements. Additionally, technicians typically now use a portable electronic device, such as a tablet, smart phone or ipad, in performing the service.

SUMMARY OF THE INVENTION

Typically, the servicing of an HVAC or air conditioning unit requires various tools, gauges, instruments and a refrigerant tank. The technician's tool bag with tools may weigh approximately 30 to 40 pounds and the set of gauges typically weigh about 10 pounds. The filled refrigerant tank typically weighs about 35 to 38 pounds. Carrying all of this to and from a service vehicle to the worksite is difficult and strenuous. It is even more difficult if the path is muddy or slick or involves stairs. Additionally, the technician typically requires his portable electronic device in performing the needed service.

At the worksite, the outside HVAC unit, typically referred to as the condenser, is typically on a concrete pad. There normally isn't enough available space on the concrete pad for the technician to place the tool bag, refrigerant tank, gauges and instruments. As a result the tool bag and refrigerant tank are often placed on the ground and the gauges have a hook to hang the gauges from the vented housing of the condenser unit. Hanging the gauges in this manner has been known to damage the fragile condenser coil which is about ½ inch from the vented housing or damage and scratch the condenser housing as the housing has not been designed for this purpose. The portable electronic device is often placed on top of the condenser unit, where it stays until the vibration of the condenser housing causes it to fall off.

Once everything is at the worksite, the technician can begin the service. Typically, a panel is removed from the condenser housing by removing 4 or 5 fasteners, such as screws or bolts. Oftentimes, one or more of these fasteners get lost during the service so the technician has to carry additional fasteners.

The gauges are hooked up to the HVAC system and used to check various conditions of the system. In some instances, the air conditioning system being serviced needs a charge of gas refrigerant, whereas in other instances liquid refrigerant may be needed to charge the system. The refrigerant tank contains gas and liquid refrigerant. The refrigerant tanks are commonly labelled indicating to leave the tank upright for gas charging and to invert the tank for liquid charging. In some situations, the refrigerant tank is not stable on the ground in either upright or inverted position and falls on its side.

It is desirable to make the job of the technician more efficient and less burdensome by eliminating the difficult task of carrying a 30+ pound refrigerant tank, a 30+ pound bag of tools and gauges/instruments to and from the service vehicle to the worksite. It is also desirable to eliminate the number of trips to and from the service vehicle to the worksite. It is further desirable to make the service provided by the technician more efficient and reliable.

BRIEF DESCRIPTION OF THE DRAWINGS

The invention is better understood by reading the detailed description of embodiments which follows and by examining the accompanying drawings, in which.

DETAILED DESCRIPTION OF THE PREFERRED EMBODIMENTS

Figure 1:
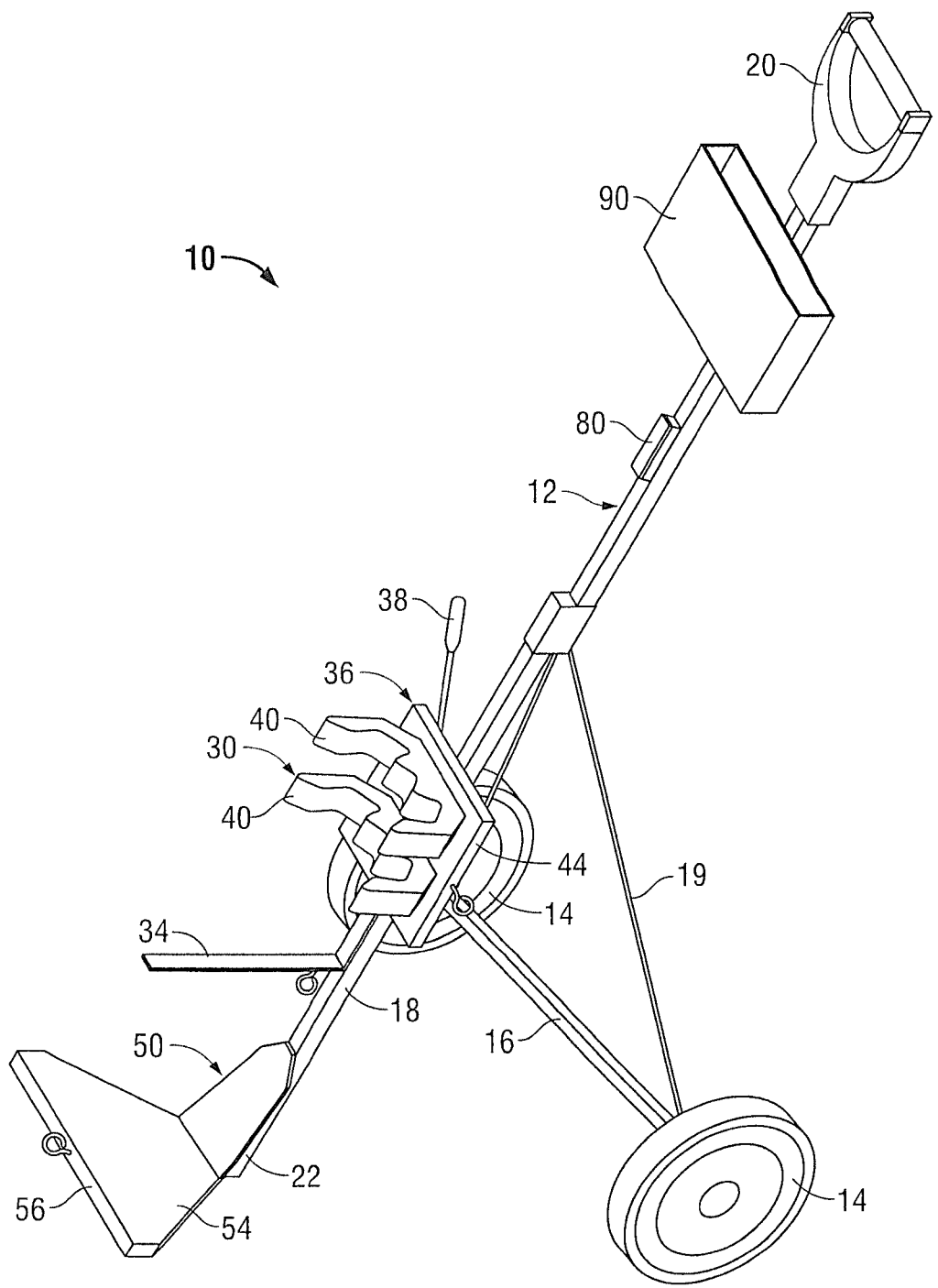
FIG. 1 is a perspective view of a charging cart assembly according to a preferred embodiment of the invention.

The aspects, features, and advantages of the invention mentioned above are described in more detail by reference to the drawings wherein like reference numerals represent like elements.

Figure 2:
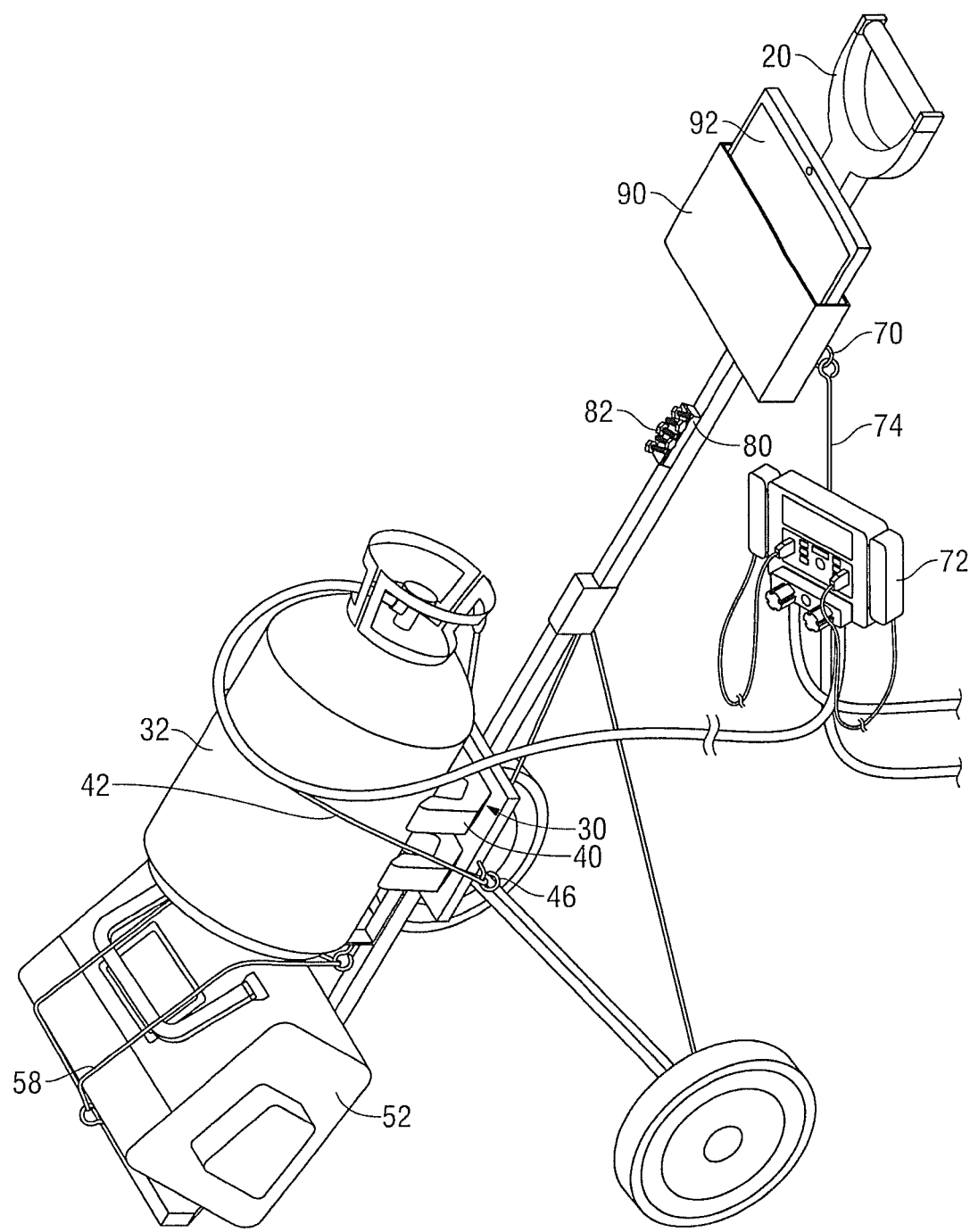
FIG. 2 is a perspective view of the charging cart assembly of FIG. 1 loaded with equipment.

Referring to FIG. 1, a first preferred embodiment of the cart assembly, generally referred to as 10, includes a tank holder assembly 30, a bag holder assembly 50, a gauge mount 70 (FIG. 2), a fastener holder 80 and a device holder 90. As shown in FIG. 2, the cart assembly 10 is capable of supporting and transporting a refrigerant tank 32, gauges 72, a tool bag 52 and a portable electronic device 92 at the same time. Additionally, a plurality of fasteners 82 may be removably attached to the fastener holder 80.

The cart assembly 10 is a wheeled cart, preferably having a pair of wheels 14 rotatably connected to a frame assembly 12 having one or more struts 16, a generally upright main member 18, and one or more connecting members 19. The generally upright main member 18 has an upper handle 20 and a lower end portion 22. The frame assembly 12 is preferably made from a lightweight, sturdy material, for example aluminum. The cart assembly 10 may be of various types and forms and is not limited to the design shown in the figures. In the preferred embodiments shown in the figures, the cart assembly 10 is portable and may be capable of being folded. In the folding version, the generally upright main member 18 is preferably a hinged two-piece main member. The folding aspect of the cart assembly 10 may be desirable depending on the service vehicle. The cart assembly 10 may be folded with the refrigerant tank 32, gauges 72, tool bag 52 and portable electronic device 92 removed.

Figure 3A:
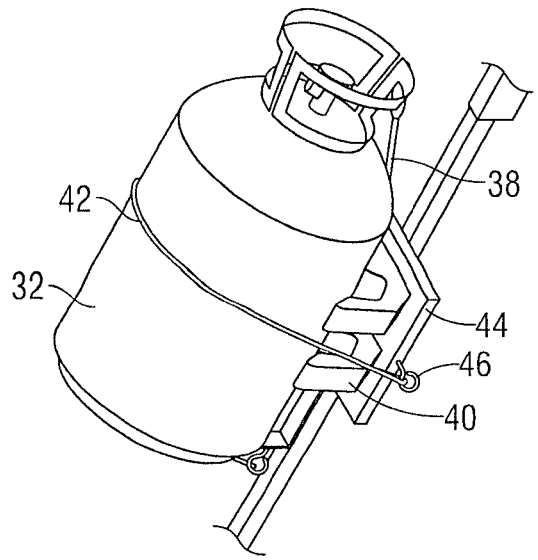
FIG. 3A is a partial perspective view showing a refrigerant tank in a generally upright position while attached to the charging cart assembly shown in FIG. 2.

Referring to FIG. 1, the tank holder assembly 30 preferably includes a bottom tank support 34, a tank swivel plate assembly 36 with handle 38, one or more side tank supports 40 and a securing strap 42 (FIG. 2). The tank swivel plate assembly 36 has one portion mounted to the generally upright main member 18 of the frame assembly 12 and a swivel plate or member 44 that is allowed to swivel or rotate relative to the portion mounted to the generally upright main member 18. The bottom tank support 34 is connected to the swivel plate 44 of the tank swivel plate assembly 36 and the side tank support(s) 40 is mounted to the swivel plate 44. As shown in FIGS. 1-3, each side tank support 40 preferably defines a generally contoured opening providing a plurality of contact points with the side of the refrigerant tank 32 when secured to the cart assembly 10. The weight of the refrigerant tank 32 may be supported by the bottom tank support 34 when the tank 32 is in a generally upright position as shown in FIGS. 2 and 3A. The generally upright position of the tank 32 is preferred when transporting to and from the service vehicle to the worksite.

Preferably, the securing strap 42 is flexible and elastic such that when tensioned it will stretch, but will return to its original length upon removal of the tensile force. One example of a suitable securing strap 42 is a bungee cord. It is to be understood that various other types of straps are suitable and known to those of skill in the art. Preferably, the securing strap 42 is attachable to opposite sides or portions of the swivel plate 44. In the preferred embodiment of FIGS. 1-3, eyebolts or rings 46 are connected to opposite sides of the swivel plate 44 or the side tank support 40 and the securing strap 42 is releasably attached to one or both of the eyebolts/rings 46. In an alternate embodiment, one or more apertures may be formed in the swivel plate 44 or the side tank support 40 and the securing strap 42 releasably attaches to the one or more apertures. It is to be understood that other forms of releasable attachments are known and within the scope of the present invention.

In an alternate embodiment, the securing strap 42 may comprise first and second straps, each being secured to an opposite side of the swivel plate 44 or side tank support 40 and having a fastening assembly for joining the first and second straps tautly around the refrigerant tank 32. In such an embodiment, the straps may not need to be as stretchable as described above.

Figure 3B:
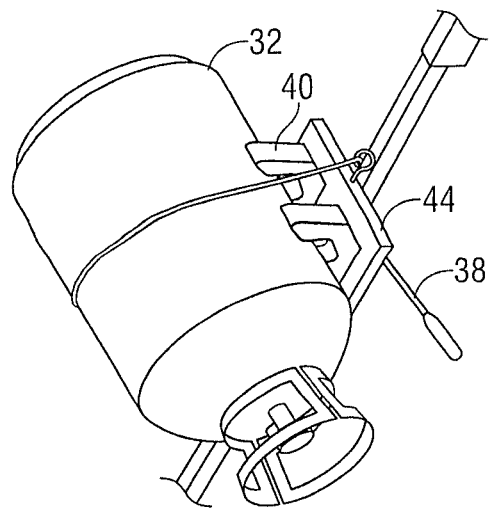
FIG. 3B is a partial perspective view showing the refrigerant tank in a generally horizontal position during the step of generally inverting the refrigerant tank while connected to the charging cart assembly shown in FIG. 2.
Figure 3C:
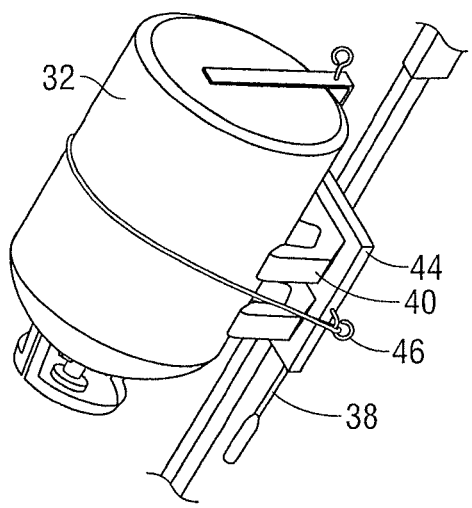
FIG. 3C is a partial perspective view showing the refrigerant tank in a generally inverted position while attached to the charging cart assembly shown in FIG. 2.

As shown in FIGS. 3A-3C, the handle 38 is manipulated to allow the swivel plate 44 to at least partially rotate relative to the portion attached to the frame assembly 12. The handle 38 has a normally-biased position which prevents relative movement of the swivel plate to the portion attached to the frame assembly 12. However, by manipulating the handle 38 and removing it from its biased position, the swivel plate 44 is allowed to rotate relative to the portion attached to the frame assembly 12. Release of the handle 38 fixes the orientation of the swivel plate 44.

Preferably, to change the orientation of the refrigerant tank 32 from the generally upright position as shown in FIGS. 2 and 3A to the generally inverted position as shown in FIG. 3C, the handle 38 is manipulated and the tank 32 is rotated 180 degrees, at which point the handle 38 is released and returns to its normal biased position, fixing the angular orientation of the tank 32 and swivel plate 44 relative to the portion attached to the frame assembly 12.

Referring to FIG. 1, the bag holder assembly 50 comprises a bag support 54 connected to the lower end portion 22 of the generally upright main member 18. The bag support 54 includes a base 56 extending forward substantially perpendicular to the generally upright main member 18. The base provides a surface to support the tool bag 52. Referring to FIG. 2, the tool bag 52 is preferably additionally secured and held in place by a releasable strap 58 attached to the bag support 54.

Referring to FIG. 2, the gauge mount 70 comprises a hook, ring or eyebolt connected to an upper portion of the generally upright main member 18 near the upper handle 20. A hanger 74 having one end attached to the gauges 72 has a second end removably connecting to the gauge mount 70.

Figure 4:
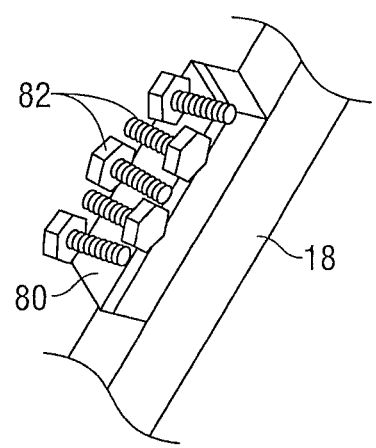
FIG. 4 is a partial perspective view showing fasteners attached to a fastener holder.

Referring to FIGS. 1, 2 and 4, the fastener holder 80 is preferably a magnet mounted to the generally upright main member 18. When the technician removes fasteners 82 to remove the condenser housing panel (not shown), the technician can place the metallic fasteners 82 in contact with the magnetic fastener holder 80 to avoid losing the fasteners 82.

Referring to FIGS. 1 and 2, the device holder 90 defines a pouch or pocket having a generally upward opening and sized to receive at least a portion of the portable electronic device 92 required by the technician.

As shown in FIGS. 1 and 2, the lower end portion 22 of the generally upright main member 18 is positioned forward of the pair of wheels 14 and the upper handle 20 is above and rearward of the pair of wheels 14. The lower end portion 22 of the generally upright main member 18 is supported by the ground or floor when the cart assembly 10 is at rest as shown in FIGS. 1 and 2. When the cart assembly 10 is being rolled by the technician, the technician grasps the upper handle 20 and lowers it to raise the lower end portion 22 of the generally upright main member 18 off of the ground such that only the pair of wheels 14 are contacting the ground.

Preferably, the refrigerant tank 32 is secured to the tank holder assembly 30 such that the weight of the refrigerant tank is forward of the pair of wheels 14. This will help to ensure that the cart assembly 10 remains in the upright position as shown in FIG. 2 even when the tool bag 52 is removed from the loaded cart assembly 10—eliminating potential damage to the gauges 72 and portable electronic device 92 if the cart assembly 10 tipped backwards.

Figure 5:
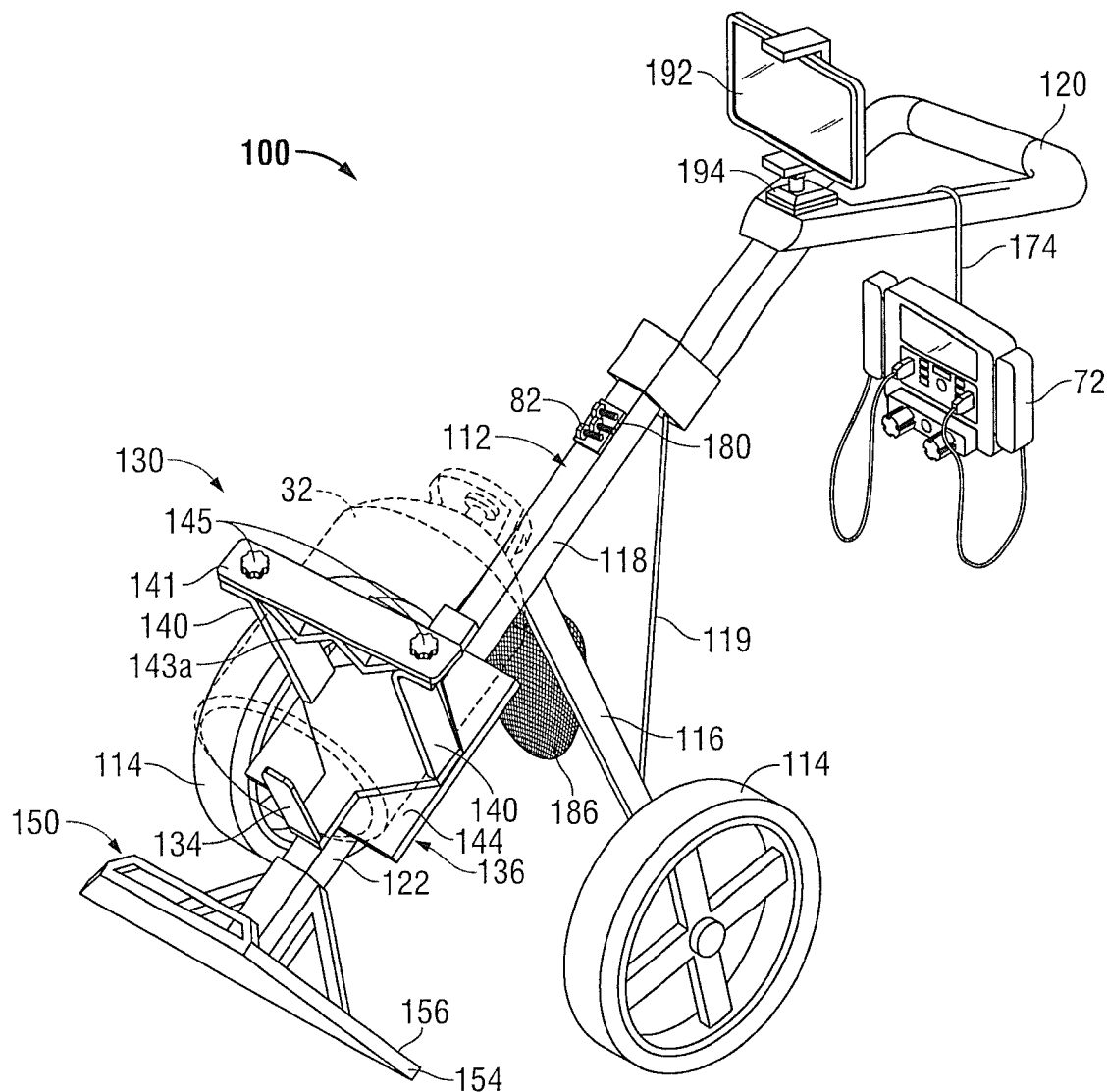
FIG. 5 is a perspective view of a charging cart assembly according to a second preferred embodiment of the invention.

A second preferred embodiment of the cart assembly, generally referred to as 100, is shown in FIG. 5. The cart assembly 100, includes a tank holder assembly 130, a bag holder assembly 150, a fastener holder 180, a sack or bag 186, and an instrument mount 194. The cart assembly 100 is capable of supporting and transporting the refrigerant tank 32, gauges 72, the tool bag (not shown) and a portable electronic device or instrument 192 at the same time. Additionally, a plurality of fasteners 82 may be removably attached to the fastener holder 180.

The cart assembly 100 is a wheeled cart, preferably having a pair of wheels 114 rotatably connected to a frame assembly 112. In this preferred embodiment, the wheels 114 are preferably wide to provide increased surface area with the ground and eliminate sinking into wet ground and making ruts. Additionally, the wide wheels 114 make it easier to move up stairs. As discussed above, the loaded cart assembly 100 may easily weigh in the range of 70 to 90 pounds when transporting the tank 32, gauges 72, tool bag 52, etc.

The frame assembly 112 has one or more struts 116, a generally upright main member 118, and one or more connecting rods 119. The generally upright main member 118 has an upper handle 120 and a lower end portion 122. The frame assembly 112 is preferably made from a lightweight, sturdy material, for example aluminum. The cart assembly 100 may be of various types and forms and is not limited to the design shown in the figures. In the preferred embodiment shown in FIG. 5, the cart assembly 100 is portable and may be capable of being folded. In the folding version, the generally upright main member 118 is preferably a hinged two-piece main member. The folding aspect of the cart assembly 100 may be desirable depending on the service vehicle. The cart assembly 100 may be folded with the refrigerant tank 32, gauges 72, tool bag 52 and instrument 192 removed.

Figure 6:
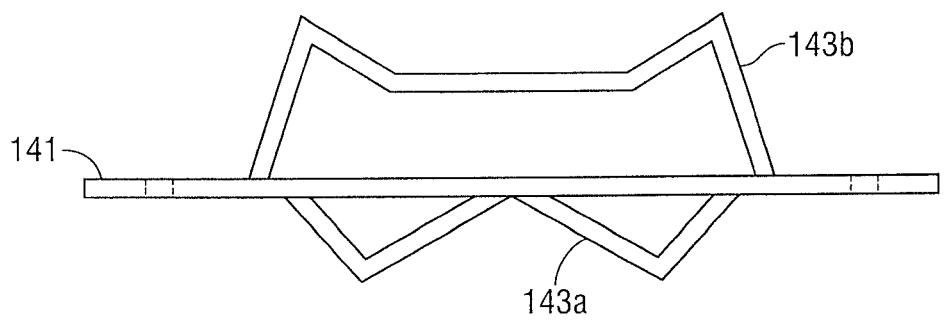
FIG. 6 is a plan view of a preferred embodiment of a universal front tank support.

Referring to FIG. 5, the tank holder assembly 130 preferably includes a bottom tank support 134, a tank swivel plate assembly 136 with handle (not shown), one or more pair of side tank supports 140 and a front tank support 141. In a preferred embodiment, one side of the front tank support 141 includes a saddle member 143a contoured to provide a gripping surface with the side of the refrigerant tank 32. A pair of support fasteners 145, for example threaded fasteners, releasably attach the front tank support 141 to the side tank supports 140. As shown in FIG. 6, a second side of the front tank support 141 may include other members 143b to accommodate securing a different size of refrigerant tank 32. Thus, the front tank support 141 can be flipped around to secure a different size of tank 32. This allows the tank holder assembly 130 to be universal. There are a few common sizes of tanks used that are very close in size. Thus, the universal front tank support 141 shown in FIG. 6 allows one to choose the appropriate side and tightly secure the tank 32 to the tank holder assembly 130.

The tank swivel plate assembly 136 has one portion mounted to the generally upright main member 118 of the frame assembly 112 and a swivel plate 144 that is allowed to swivel or rotate relative to the portion mounted to the generally upright main member 118. The side and bottom tank supports 140 and 134 are connected to the swivel plate 144 and rotate as the swivel plate 144 rotates. It is to be understood that the movement of the attached refrigerant tank 32 is similar as described above and as shown in FIGS. 3A, 3B and 3C. The weight of the refrigerant tank 32 is supported by the bottom tank support 134 when the tank 32 is in a generally upright position as shown in FIG. 5.

Referring to FIG. 5, the bag holder assembly 150 comprises a bag support 154 with lateral bracing connected to the lower end portion 122 of the generally upright main member 118. The bag support 154 includes a base 156 extending forward substantially perpendicular to the generally upright main member 118 and extending laterally to the left and right sides of the generally upright main member 118. The base 156 provides a surface to support the tool bag 52 and includes an upward lip at the front of the base to keep the tool bag 52 on the bag support 154. The lateral bracing helps support the bag weight on the base 156.

The upper handle 120 in the embodiment shown in FIG. 5 is preferably shaped to allow the gauges 72 to be hung from the handle 120 with the hanger 74. The allows the technician versatility to hang the gauges 72 in various locations on the upper handle 120 for ease of reading and access during servicing of the unit. The portable electronic device or instrument 192 is also mounted to the frame assembly 112 via an instrument mount 194, preferably at or near the upper handle 120, to where it can be rotated and angled to best accommodate the technician during service of the unit. This allows the technician to be able to view the screen of the instrument 192 and input data while attached to the cart assembly 100.

The fastener holder 180 is preferably a magnet mounted to the generally upright main member 118. When the technician removes fasteners 82 to remove the condenser housing panel (not shown), the technician can place the metallic fasteners 82 in contact with the magnetic fastener holder 180 to avoid losing the fasteners 82.

A sack 186 may be releasably attached to the frame assembly 112, preferably the generally upright main member 118. The sack 186 may be made of mesh netting and provides the cart assembly 100 with a place for the technician put a few service parts, for example contactors, capacitors, hard start kits, etc. This can save the technician time from having to go back to the service truck during the service call.

The advantages and benefits of the preferred embodiment of the present invention include, but are not limited to, the following:
  being able to transport refrigerant tank, tool bag, gauges, instrument or portable electronic device from service vehicle to worksite in one trip by one person;
  ease of positioning and maintaining desired orientation of refrigerant tank at the worksite;
  minimizing risk of damaging gauges and portable electronic device as a result of falling off condenser;
  minimizing risk of damaging condenser housing;
  minimizing risk of losing condenser housing fasteners upon removal of panel;
  portable, lightweight, compact cart assembly for transporting necessary tools, refrigerant, etc.

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

I claim:

1. A charging cart assembly comprising:
   a frame having a handle;
   at least one wheel rotatably mounted to the frame, wherein the frame and at least one wheel contact a ground surface when in a first position;
   a swivel plate assembly mounted to the frame, the swivel plate assembly including a tank securing device;
   a tool bag support secured to the frame; and
   an attachment device secured to the frame, the attachment device arranged and designed to support a gauge,
   wherein in the first position the swivel plate assembly and the tool bag support are positioned forward of the at least one wheel and the handle is positioned rearward of the at least one wheel.

2. The charging cart assembly of claim 1, wherein the swivel plate assembly includes a tank bottom support.

3. The charging cart assembly of claim 2, wherein the swivel plate assembly includes a lever to permit a swivel action.

4. The charging cart assembly of claim 1, wherein the tank securing device is arranged and designed to secure a refrigerant tank to the swivel plate assembly, and the swivel plate assembly with the refrigerant tank secured thereto has a generally upright position in which the refrigerant tank is in a generally upright position and has a generally inverted position in which the refrigerant tank is in a generally inverted position.

5. The charging cart assembly of claim 1, further comprising an electronic device holder attached to the frame.

6. The charging cart assembly of claim 1, further comprising a screw holder attached to the frame.

7. The charging cart assembly of claim 6, wherein the screw holder is a magnet.

8. The charging cart assembly of claim 1, wherein
the at least one wheel comprises a pair of wheels;
the frame comprises a generally upright main member having a lower end portion,
wherein in the first position, the pair of wheels and the lower end portion of the frame contact the ground surface.

9. A charging cart assembly for transporting a refrigerant tank, the charging cart assembly comprising:
a frame assembly having a handle at an upper end of the frame assembly;
two wheels rotatably mounted to the frame assembly,
wherein the combination of the frame assembly and two wheels are arranged and designed to contact a ground surface at at least three locations when in a first position; and
a swivel plate assembly mounted to the frame assembly, the swivel plate assembly including a tank securing device arranged and designed to secure the refrigerant tank to the swivel plate assembly,
wherein the swivel plate assembly with the refrigerant tank secured thereto has a generally upright position in which the refrigerant tank is in a generally upright position and has a generally inverted position in which the refrigerant tank is in a generally inverted position.

10. The charging cart assembly of claim 9, wherein the swivel plate assembly includes a lever to permit a swivel action.

11. The charging cart assembly of claim 9, wherein the swivel plate assembly includes a tank bottom support.

12. The charging cart assembly of claim 9, further comprising a tool bag support secured to the frame assembly, the tool bag support arranged and designed to support a tool bag.

13. The charging cart assembly of claim 9, further comprising an attachment device secured to the frame assembly, the attachment device arranged and designed to support one or more gauges.

14. The charging cart assembly of claim 9, wherein in the first position the swivel plate assembly is positioned forward of the two wheels and the handle is positioned rearward of the two wheels.

15. The charging cart assembly of claim 14, wherein in the first position a tool bag support is positioned forward of the two wheels.

16. The charging cart assembly of claim 9, further comprising an instrument mount connected to the frame assembly at or near the handle, the instrument mount arranged and designed to support an instrument or portable electronic device.

17. The charging cart assembly of claim 16, wherein the instrument mount allows angular adjustment.

18. The charging cart assembly of claim 9, wherein the tank securing device includes a pair of side tank supports, a front tank support, and a pair of support fasteners for releasably attaching the front tank support to the side tank supports.

19. A charging cart assembly comprising:
a frame comprising a generally upright main member having an upper handle and a lower end portion;
a pair of wheels rotatably mounted to the frame;
a swivel plate assembly mounted to the frame, the swivel plate assembly including a tank securing device; and
a tool bag support secured to the frame,
wherein in a first position, the combination of the pair of wheels and the lower end portion of the frame contact a ground surface at at least three locations and the swivel plate assembly and the tool bag support are positioned forward of the pair of wheels and the upper handle is positioned rearward of the pair of wheels.

20. The charging cart assembly of claim 19, wherein the swivel plate assembly including the tank securing device are arranged and designed to secure a tank to the swivel plate assembly, and the swivel plate assembly with the tank secured thereto has a generally upright position in which the tank is in a generally upright position and has a generally inverted position in which the tank is in a generally inverted position.

* * * * *